United States Patent
Liao et al.

(10) Patent No.: US 12,492,482 B2
(45) Date of Patent: Dec. 9, 2025

(54) RELEASE CARRIER STRUCTURE AND COPPER FOIL COMPOSITE STRUCTURE

(71) Applicant: NAN YA PLASTICS CORPORATION, Taipei (TW)

(72) Inventors: Te-Chao Liao, Taipei (TW); Wei-Sheng Cheng, Taipei (TW); Yu-Chi Hsieh, Taipei (TW); Chia-Shan Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 283 days.

(21) Appl. No.: 18/502,095

(22) Filed: Nov. 6, 2023

(65) Prior Publication Data
US 2025/0092554 A1    Mar. 20, 2025

(30) Foreign Application Priority Data
Sep. 20, 2023  (TW) .................... 112135814

(51) Int. Cl.
*C25D 1/20* (2006.01)
*C25D 1/04* (2006.01)
*C25D 9/04* (2006.01)

(52) U.S. Cl.
CPC .......... *C25D 1/20* (2013.01); *C25D 1/04* (2013.01); *C25D 9/04* (2013.01)

(58) Field of Classification Search
None
See application file for complete search history.

(56) References Cited

U.S. PATENT DOCUMENTS

| | | | | |
|---|---|---|---|---|
| 2018/0376602 A1* | 12/2018 | Matsuura | ............ | C23C 18/1653 |
| 2024/0138075 A1* | 4/2024 | Chun | ................... | H05K 3/382 |

FOREIGN PATENT DOCUMENTS

| | | | | | |
|---|---|---|---|---|---|
| JP | 2001301087 | | 10/2001 | | |
| JP | 2002292788 A | * | 10/2002 | ............ | B32B 15/08 |
| JP | 2007186781 | | 7/2007 | | |
| JP | WO 2014/132947 A | * | 2/2017 | ............ | B32B 15/20 |
| JP | 2018138702 | | 9/2018 | | |
| JP | 2020125542 A | * | 8/2020 | ............ | C25D 5/605 |
| TW | 201707959 | | 3/2017 | | |
| WO | 2010027052 | | 3/2010 | | |
| WO | 2014132947 | | 9/2014 | | |
| WO | WO-2017033639 A1 | * | 3/2017 | ........ | H01L 21/02112 |
| WO | WO-2017051898 A1 | * | 3/2017 | ............... | H05K 3/46 |

OTHER PUBLICATIONS

Sato—JP 2002-292788 A—MT—release layer w—azole + inorganic layer—2002 (Year: 2002).*
Fujita—JPWO 2014-132947 A1—JapRej D5—MT—two release layers—2014 (Year: 2014).*
Maruyama—WO 2017-033639 A1 sis IDS—MT—release substrate—2017 (Year: 2017).*

(Continued)

*Primary Examiner* — John Vincent Lawler
(74) *Attorney, Agent, or Firm* — JCIPRNET

(57) ABSTRACT

A release carrier structure includes a carrier layer, a first release layer, and a second release layer. A weight ratio of organic matter in the second release layer is greater than a weight ratio of organic matter in the first release layer.

9 Claims, 4 Drawing Sheets

(56) References Cited

OTHER PUBLICATIONS

Moriyama—WO 2017-051898 A1—MT—release layer w—azole + barrier—2017 (Year: 2017).*
Lai—JP 2020-125542 A—MT—azole release + metal layer—2020 (Year: 2020).*
"Office Action of Taiwan Counterpart Application", issued on Jun. 6, 2024, p. 1-p. 6.
"Office Action of Japan Counterpart Application", issued on Feb. 19, 2025, p. 1-p. 4.

* cited by examiner

RELEASE CARRIER STRUCTURE AND COPPER FOIL COMPOSITE STRUCTURE

CROSS-REFERENCE TO RELATED APPLICATION

This application claims the priority benefit of Taiwan application serial no. 112135814, filed on Sep. 20, 2023. The entirety of the above-mentioned patent application is hereby incorporated by reference herein and made a part of this specification.

BACKGROUND

Technical Field

The disclosure relates to a release carrier structure and a copper foil composite structure, and more particularly, to a release carrier structure and a copper foil composite structure that include an organic release layer.

Related Art

In a manufacturing method of a copper foil, generally, a corresponding copper foil is formed on a corresponding carrier structure, and then, the copper foil formed on the carrier structure is removed or separated by tearing or peeling.

Due to miniaturization of electronic devices, thin copper foils with a thickness of about 10 micrometers (μm) or ultra-thin copper foils that are even thinner are commonly used in the manufacturing of micro or thin printed circuit boards. However, in the manufacturing process of thin copper foils or ultra-thin copper foils (especially with the removal or separation method by tearing or peeling as described above), if the bonding force between the copper foil and the carrier structure is too strong, it often requires a greater force to tear or peel off the copper foil. If a larger force is applied or the applied force is uneven, it is likely to cause damage, wrinkles, or patterns in the copper foil.

Thus, how to improve the quality of a copper foil by improving the carrier structure is a topic to be researched in the art.

SUMMARY

The disclosure provides a release carrier structure and a copper foil composite structure including the release carrier structure in which a copper foil can be easily separated from a corresponding release layer.

A release carrier structure of the disclosure includes a carrier layer, a first release layer, and a second release layer. A weight ratio of organic matter in the second release layer is greater than a weight ratio of organic matter in the first release layer.

A copper foil composite structure of the disclosure includes the release carrier structure according to the disclosure and a copper foil. The copper foil is located on the second release layer of the release carrier structure.

Based on the above, in the release carrier structure of the disclosure and the copper foil composite structure including the release carrier structure, the copper foil can be easily separated from the corresponding organic release layer (e.g., the second release layer).

DESCRIPTION OF EMBODIMENTS

In the following detailed description, for illustration rather than limitation, exemplary embodiments disclosing specific details will be set forth to provide a thorough understanding of various principles of the disclosure. It will be apparent, however, to one of ordinary skill in the art that, benefiting from this disclosure, the disclosure may be practiced in other embodiments that depart from the specific details disclosed herein. Furthermore, descriptions of commonly known devices, methods, and materials may be omitted so as not to shift the focus from the description of the various principles of the disclosure.

Ranges may be expressed herein as "about" one particular value to "about" another particular value, which may also be expressed directly as one particular value and/or to another particular value. When expressing the range, another embodiment includes the one particular value and/or to the other particular value. Similarly, when values are expressed as approximations with the preceding word "about", it will be understood that the particular value forms another embodiment. It will be further understood that an endpoint of each range is associated or unassociated with the other endpoint.

In the text herein, non-limiting terms (e.g., "may", "can", "for example", or other similar terms) indicate non-essential or optional implementations, inclusions, additions, or presence.

Unless otherwise defined, all terms (including technical and scientific terms) used herein have the same meaning as commonly understood by one of ordinary skill in the art to which this disclosure belongs. It will also be understood that terms (such as those defined in commonly used dictionaries) should be interpreted to have meanings consistent with those in the relevant technical context and should not be interpreted in an idealized or overly formal sense, unless explicitly defined as such.

In the drawings, for clarity, the thickness of some film layers may have been exaggerated.

Figure 1:
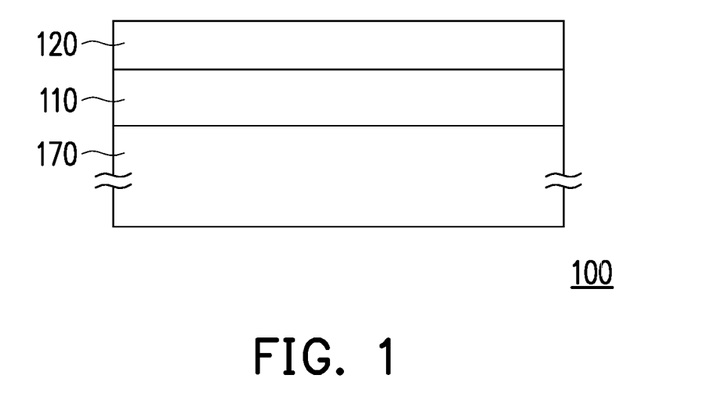
FIG. 1 is a schematic cross-sectional diagram of a release carrier structure according to an embodiment of the disclosure.

FIG. 1 is a schematic cross-sectional diagram of a release carrier structure according to an embodiment of the disclosure.

Referring to FIG. 1, a release carrier structure 100 includes a carrier layer 170, a first release layer 110, and a second release layer 120.

[Carrier Layer of Release Carrier Structure]

In the disclosure, a material of the carrier layer 170 is not particularly limited as long as the carrier layer 170 is adaptable for carrying a film, a layer, and/or a component thereon and is adaptable for subsequent applications. In an embodiment, the carrier layer 170 may be a metal material in a sheet shape, a plate shape, or a block shape. In a preferred embodiment, the carrier layer 170 may be a copper material (e.g., a copper sheet, a copper plate, or a copper block), which is preferred possibly because the copper material may have a same or similar coefficient of thermal expansion (CTE) and/or same or similar physical or chemical properties as a copper layer (e.g., a copper plating layer or a copper foil) formed subsequently thereon.

In an embodiment, a thickness of the carrier layer 170 may be about 18 micrometers (μm) to about 35 μm.

[First Release Layer of Release Carrier Structure]

In an embodiment, a weight ratio of inorganic matter in the first release layer 110 is greater than a weight ratio of inorganic matter in the second release layer 120. In an embodiment, the first release layer 110 may be referred to as an inorganic release layer. In an embodiment, the first release layer 110 essentially does not contain organic matter.

In a preferred embodiment, the first release layer 110 may be formed of an inorganic metal salt, which is preferred possibly because compared to the bonding between a film layer (e.g., the second release layer 120) subsequently formed of an organic material and a metal (e.g., copper), the first release layer 110 formed of an inorganic metal salt may have a better bonding force with both of them. That is, the bonding force between the first release layer 110 and the carrier layer 170 of metal (e.g., copper) may be greater than the bonding force between the film layer (e.g., the second release layer 120) formed of an organic material and metal (e.g., copper), and the bonding force between the first release layer 110 and the film layer (e.g., the second release layer 120) formed of an organic material may be greater than the bonding force between the film layer (e.g., the second release layer 120) formed of an organic material and metal (e.g., copper).

In an embodiment, the first release layer 110 may be formed on the carrier layer 170 by electroplating. An electrolytic solution used in the electroplating may be an electrolyte compound containing nickel, cobalt, molybdenum, manganese, iron, and/or tungsten. For example, it may be a sulfate, a nitrate, a phosphate, or a chloride of nickel, cobalt, molybdenum, manganese, iron, and/or tungsten, a salt derived from an oxide of these metals, and/or a hydrate of the salt.

In an embodiment, before forming the first release layer 110 on the carrier layer 170, a pre-treatment may be performed as appropriate on the carrier layer 170. The pre-treatment may include, but is not limited to, acid washing, alkali washing, degreasing, and/or electrolytic cleaning to make an outer surface of the carrier layer 170 cleaner and/or easier for the first release layer 110 to adhere to.

In an embodiment, the nickel-containing compound may include, for example, nickel sulfate, nickel ammonium sulfate, nickel nitrate, or nickel chloride.

In an embodiment, the cobalt-containing compound may include, for example, cobalt sulfate, cobalt nitrate, cobalt phosphate, cobalt chloride, or cobalt (II) chloride.

In an embodiment, the molybdenum-containing compound may include, for example, sodium molybdate, potassium molybdate, molybdenum disulfide, molybdenum nitrate, molybdenum phosphate, or molybdenum chloride.

In an embodiment, the manganese-containing compound may include, for example, manganese sulfate, manganese nitrate, manganese phosphate, or manganese chloride.

In an embodiment, the iron-containing compound may include, for example, iron sulfate, iron nitrate, iron phosphate, or iron chloride.

In an embodiment, the tungsten-containing compound may include, for example, sodium tungstate or potassium tungstate.

In an embodiment, a solvent of the electrolyte may be water.

By adding an acid agent or an alkali agent, the electrolytic solution may have a corresponding pH value. In an embodiment, the pH value of the electrolytic solution may be about 2.5 to 4.5. In an embodiment, the added acid agent may include sulfuric acid, nitric acid, hydrochloric acid, or phosphoric acid.

In an embodiment, a temperature of the electrolysis may be approximately within the range of 20° C. to 60° C. In an embodiment, a current density of the electrolysis may be approximately within the range of 0.1 A/dm$^2$ to 50 A/dm$^2$.

In an embodiment, a concentration of plated metal ions in the electrolytic solution may be about 0.005 M (molar, mol/L) to 0.5 M.

In an embodiment, a conductivity of the electrolytic solution may be adjusted by adding another non-plated electrolyte. A metal contained in the "non-plated electrolyte" is essentially not reduced and plated on the carrier layer 170. The "non-plated electrolyte" may include a corresponding potassium salt or sodium salt, for example.

In an embodiment, an electroplating time may be adjusted according to the requirements (e.g., a corresponding thickness) or corresponding conditions (e.g., a current density, an electroplating temperature, and/or a concentration of plated metal ions).

In an embodiment, the electroplating layer formed on the carrier layer 170 may essentially be referred to as the first release layer 110.

In an embodiment, after the electroplating, preferably, the carrier layer 170 and the electroplating layer thereon may be heated as appropriate to form the corresponding first release layer 110. One possible reason for this preference may lie in that doing so may promote formation of a corresponding eutectic mixture between the metal in the first release layer 110 and the metal in the carrier layer 170 to thereby enhance the bonding force between the first release layer 110 and the carrier layer 170. Another possible reason for this preference may lie in that doing so may promote oxidation and/or roughening of the outer surface (i.e., the surface that is not in contact with the carrier layer 170 and is exposed to outside) of the first release layer 110 and thereby enhance the bonding force between the first release layer 110 and the second release layer 120 subsequently formed.

In an embodiment, a thickness of the first release layer 110 may be about 10 nanometers (nm) to 1 μm, and preferably, about 50 nm to 300 nm.

[Second Release Layer of Release Carrier Structure]

After forming the corresponding first release layer 110 on the carrier layer 170, the second release layer 120 may be formed on the first release layer 110.

In an embodiment, a weight ratio of organic matter in the second release layer 120 is greater than a weight ratio of organic matter in the first release layer 110. In an embodiment, a weight ratio of inorganic matter in the second release layer 120 is less than a weight ratio of inorganic matter in the first release layer 110. In an embodiment, the second release layer 120 may essentially not include inorganic matter. In an embodiment, the second release layer 120 may be referred to as an organic release layer.

In an embodiment, a corresponding film-forming composition may be formed on the first release layer 110 by spraying, roll coating, impregnating, sprinkling, or other suitable methods. Then, the film-forming composition on the first release layer 110 may be selectively solidified or semi-solidified by an appropriate method (e.g., heating and/or leaving to stand) to form the corresponding second release layer 120. In an embodiment, the process of forming the corresponding film-forming composition on the first release layer 110 may be carried out in an environment of about 15° C. to 70° C., and may be preferably carried out in an environment of room temperature (about 25° C.) to 70° C.

In an embodiment, the film-forming composition may include an azole compound.

In an embodiment, in the film-forming composition, a concentration of the azole compound may be about 0.1 gram/liter to about 50 gram/liter.

In an embodiment, the azole compound may include imidazole, triazole, tetrazole, a derivative thereof, or a mixture thereof. The "derivative" may be one in which hydrogen connected to the carbon atom in the azole ring is substituted by an electron-donating group, or one in which an azole ring is fused/condensed with an aromatic ring. The "electron-donating group" may be, for example, a dialkylamino group (—NRR'), an alkylamino group (—NHR), an amino group (—$NH_2$), a hydroxyl group (—OH), or an alkoxy (—OR), and is preferably a nitrogen-containing electron-donating group, and is more preferably an amino group. The "aromatic ring" may be, for example, a benzene ring or a naphthalene ring, and is preferably a benzene ring.

In an embodiment, the film-forming composition may have a corresponding basicity by adding an alkali agent. In an embodiment, the added alkali agent may include sodium hydroxide, potassium hydroxide, or a mixture thereof. In an embodiment, a base equivalent of the film-forming composition is approximately equivalent to about 0.1 wt % to about 20 wt % of sodium hydroxide.

In an embodiment, if the film-forming composition includes an azole compound with an azole ring fused/condensed with an aromatic ring, a corresponding conjugate base may be stabilized by the benzene ring in an alkaline environment. In this manner, the film-forming composition and/or the correspondingly formed film layer may be more stable. In an embodiment, the azole compound with an azole ring fused/condensed with an aromatic ring may be, for example, benzotriazole (CAS: 95-14-7).

In an embodiment, if the film-forming composition includes an azole compound in which hydrogen of the carbon atom in the azole ring is substituted by an amino group, it is less likely to form a corresponding ammonium ion (—$NH_3+$) state in an alkaline environment. In this manner, the film-forming composition and/or the correspondingly formed film layer may be more stable, and/or may exhibit better bonding with the first release layer 110. In an embodiment, the azole compound in which hydrogen of the carbon atom in the azole ring is substituted by an amino group may include aminotetrazole, aminotriazole, or aminodiazole. In an embodiment, aminotetrazole may include 5-aminotetrazole (CAS: 4418-61-5) and 1,5-diaminotetrazole (CAS: 2165-21-1). In an embodiment, aminodiazole may include 2-amino-1,3,4-thiadiazole (CAS: 4005-51-0). In an embodiment, aminotriazole may include 3,5-diamino-1,2,4-triazole (CAS: 1455-77-2).

In an embodiment, the film-forming composition may be a sodium hydroxide aqueous solution including aminotetrazole and benzotriazole, in which a concentration of aminotetrazole is about 0.1 gram/liter (g/L) to 10 g/L, a concentration of benzotriazole is about 0.1 g/L to 10 g/L, and a concentration of sodium hydroxide is about 0.1 wt % to 5 wt %.

In an embodiment, the film-forming composition may be a sodium hydroxide aqueous solution including 2-amino-1,3,4-thiadiazole, 3,5-diamino-1,2,4-triazole, and benzotriazole. In an embodiment, in the film-forming composition, a weight concentration ratio of 2-amino-1,3,4-thiadiazole, 3,5-diamino-1,2,4-triazole, and benzotriazole is about 1:1:1 to 1:1:3. In an embodiment, in the film-forming composition, a total weight concentration of 2-amino-1,3,4-thiadiazole, 3,5-diamino-1,2,4-triazole, and benzotriazole is about 0.1 g/L to 10 g/L, and a concentration of sodium hydroxide is about 0.1 wt % to 5 wt %.

In an embodiment, a thickness of the second release layer 120 may be about 1 nm to 100 nm, is more preferably 1 nm to 50 nm, and is even more preferably 1 nm to 20 nm.

[Release Carrier Structure]

Referring to FIG. 1 again, in the release carrier structure 100, the first release layer 110 may be interposed between the carrier layer 170 and the second release layer 120. The two opposite sides of the first release layer 110 may be respectively in contact with the carrier layer 170 and the second release layer 120.

In an embodiment, since the material and formation method of the first release layer 110 are different from the material and formation method of the second release layer 120, a corresponding contact interface may be present between the first release layer 110 and the second release layer 120.

In an embodiment, a corresponding eutectic mixture may be formed at a contact spot between the first release layer 110 and the carrier layer 170.

[Copper Foil Composite Structure]

Figure 2:
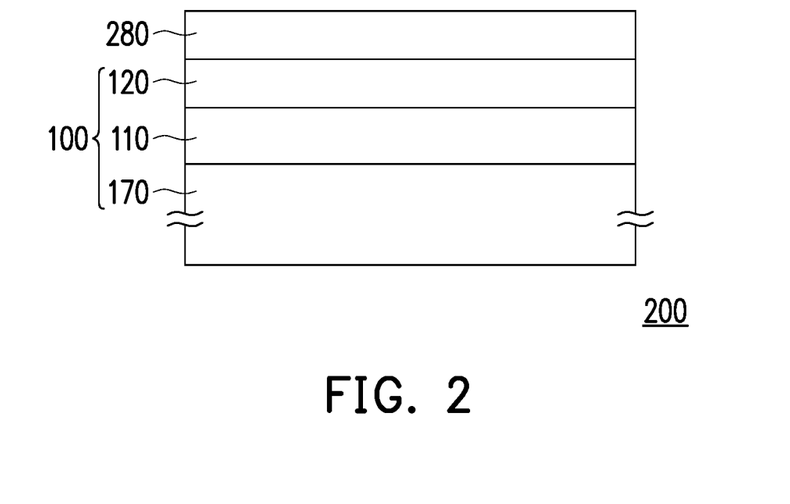
FIG. 2 is a schematic cross-sectional diagram of a copper foil composite structure according to an embodiment of the disclosure.

FIG. 2 is a schematic cross-sectional diagram of a copper foil composite structure according to an embodiment of the disclosure.

A copper foil composite structure 200 may be formed of the release carrier structure 100 of the embodiment described above.

In an embodiment, a corresponding copper foil 280 may be formed on the second release layer 120 by sputtering, electroplating after sputtering, or other suitable or commonly adopted methods.

In an embodiment, a thickness of the copper foil 280 may be about 1 μm to 5 μm.

[Application Method of Copper Foil Composite Structure]

An application method of the copper foil composite structure 200 may be adjusted as appropriate according to the requirements and is not particularly limited in the disclosure.

In an embodiment, the copper foil composite structure 200 shown in FIG. 2 may be cut as appropriate.

In an embodiment, the copper foil composite structure 200 shown in FIG. 2 may be rolled up as appropriate.

In an embodiment, the copper foil 280 in the copper foil composite structure 200 shown in FIG. 2 may be patterned by a suitable method.

In an embodiment, another film layer may be formed on the copper foil 280 in the copper foil composite structure 200 shown in FIG. 2 by a suitable method.

Figure 3:
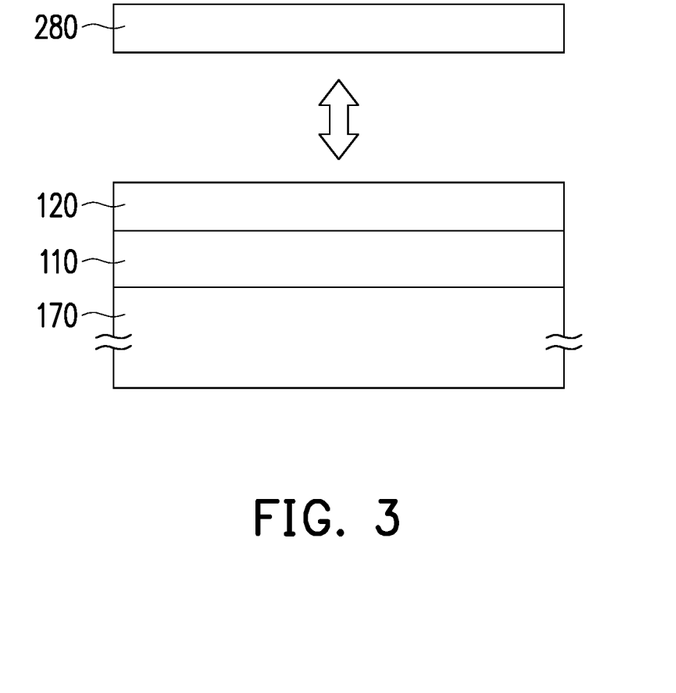
FIG. 3 is a schematic cross-sectional diagram of a schematic application method of a copper foil composite structure according to an embodiment of the disclosure.

In an embodiment, as shown in FIG. 2 to FIG. 3, the copper foil 280 (which may include the unpatterned copper foil or the patterned copper foil) may be separated from the second release layer 120.

In an embodiment, the copper foil composite structure 200 is heated and pressurized according to the requirements of a copper foil substrate manufacturing process. As a result, a different degree of peel force is exhibited in the process of separating the copper foil 280 from the second release layer 120.

With the second release layer 120 according to the embodiment of the disclosure, the copper foil 280 can be easily separated from the second release layer 120. In this manner, it is less likely to cause damage, less likely to produce wrinkles, or less likely to produce patterns resulting from uneven stress in the process of separating the copper foil 280 or in the separated copper foil 280.

EXAMPLE AND COMPARATIVE EXAMPLE

An example and a comparative example will be provided below to specifically describe the disclosure, and the disclosure is not limited by the following example.

EXAMPLE

A copper foil composite structure of Example was formed by the method described in the embodiment above. The copper foil composite structure of Example included a release carrier structure and a copper foil plated thereon. A cross-section of the copper foil composite structure of Example may be the same as or similar to that shown in FIG. 2. That is, in the copper foil composite structure of Example, the release carrier structure may be the same as or similar to the release carrier structure 100 of the embodiment described above. Moreover, the material, thickness, or formation method of the copper foil, the second release layer, the first release layer, and/or the carrier layer in Example may be respectively the same as or similar to the material, thickness, or formation method of the copper foil 280, the second release layer 120, the first release layer 110, and/or the carrier layer 170 of the embodiment described above.

In Example, the film-forming composition used to form the second release layer was a sodium hydroxide aqueous solution including 2-amino-1,3,4-thiadiazole, 3,5-diamino-1,2,4-triazole, and benzotriazole. A total concentration of 2-amino-1,3,4-thiadiazole, 3,5-diamino-1,2,4-triazole, and benzotriazole was about 0.1 g/L to 10 g/L, a formulation weight ratio was 1:1:1 to 1:1:3, and a concentration of sodium hydroxide was about 0.1 wt % to 5 wt %.

Comparative Example 1

A copper foil composite structure of Comparative Example 1 was similar to the copper foil composite structure of Example, and the difference lies in that the copper foil composite structure of Comparative Example 1 did not have any film layer that is the same as or similar to the second release layer.

Figure 4:
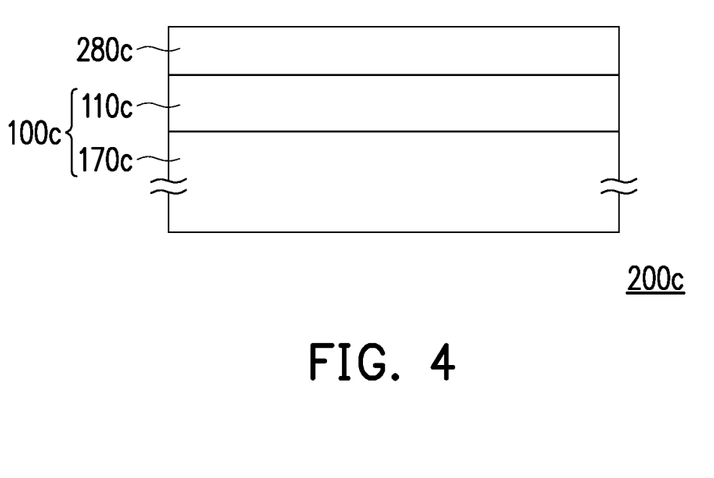
FIG. 4 is a schematic cross-sectional diagram of a copper foil composite structure according to a comparative example of the disclosure.

Specifically, referring to FIG. 4, a copper foil composite structure 200c of Comparative Example 1 included a release carrier structure 100c and a copper foil 280c plated thereon. The release carrier structure 100c included a carrier layer 170c and a release layer 110c.

In the copper foil composite structure 200c of Comparative Example 1, the material, thickness, or formation method of the copper foil 280c, the release layer 110c, and/or the carrier layer 170c may be respectively the same as or similar to the material, thickness, or formation method of the copper foil, the first release layer, and/or the carrier layer in Example.

[Evaluation of Example and Comparative Example 1]

Using a common or standard peel test method (e.g., ASTM D1000, ASTM D3330, or a similar test), the copper foil was peeled off at different temperatures. Ten sets of experiments were repeatedly performed under the same test conditions, and a mean (unit: gf/cm) of a minimum peel force required to peel off the copper foil and a corresponding standard deviation (unit: gf/cm) were recorded. The test results are presented in Table 1.

TABLE 1

| | Test condition | | | | | |
|---|---|---|---|---|---|---|
| | Room temperature (about 23° C.) | | First leaving to stand for about 5 minutes in environment of about 390° C. | | First leaving to stand for about 90 minutes in environment of about 200° C. | |
| | Mean | Standard deviation | Mean | Standard deviation | Mean | Standard deviation |
| Comparative Example 1 | 36.5 | 14.3 | 44.0 | 15.6 | 106.0 | 38.6 |
| Example | 5.02 | 3.9 | 9.2 | 6.4 | 18.7 | 8.0 |

In the above test, the environment of about 390° C. may be used to simulate the temperature range that may correspond to a flexible board manufacturing process, and the environment of about 200° C. may be used to simulate the temperature range that may correspond to a rigid board manufacturing process.

As shown in Table 1, compared to Comparative Example 1, the copper foil on the copper foil composite structure of Example may be peeled off more easily. Thus, in multiple experiments, the copper foil peeled off from the copper foil composite structure of Example was not damaged, and there were almost no wrinkles visible to the naked eye or patterns resulting from uneven stress.

Comparative Example 2

An appearance of a copper foil composite structure in Comparative Example 2 was essentially the same as an appearance of the copper foil composite structure in Example, and the difference lies in that a film-forming composition used to form a second release layer was different. Specifically, in Comparative Example 2, the film-forming composition used to form the second release layer is a sodium hydroxide aqueous solution including benzotriazole. That is, in Comparative Example 2, the film-forming composition used to form the second release layer did not include other azole compounds (e.g., aminodiazole, aminotriazole, and aminotetrazole) other than benzotriazole. Moreover, a concentration of benzotriazole in the film-forming composition in Comparative Example 2 was essentially the same as a total of aminotetrazole and benzotriazole in the film-forming composition of Example.

A peel force required to peel off the copper foil of the copper foil composite structure in Comparative Example 2 was greater than the peel force required to peel off the copper foil of the copper foil composite structure in Example.

The peel force required to peel off the copper foil of the copper foil composite structure in Comparative Example 2 was slightly less than the peel force required to peel off the copper foil of the copper foil composite structure in Comparative Example 1.

In summary of the above, the release carrier structure of the embodiment of the disclosure is adaptable for forming the copper foil composite structure of the embodiment of the disclosure. Moreover, in the copper foil composite structure of the embodiment of the disclosure, the copper foil can be easily separated from the corresponding release layer (e.g., the second release layer).

The release carrier structure of the embodiment of the disclosure is adaptable for forming the copper foil composite structure of the embodiment of the disclosure. The copper foil composite structure of the embodiment of the disclosure is adaptable for subsequent processing to serve as a material for producing electronic products (e.g., circuit boards).

What is claimed is:

1. A release carrier structure comprising:
   a carrier layer, a first release layer, and a second release layer, in this order,
   wherein the relative mass of organic matter in a layer to the total mass of a layer is greater in the second release layer than in in first release layer,
   wherein a thickness of the second release layer is 1 nm to 20 nm.

2. The release carrier structure according to claim 1, wherein the second release layer is formed of a film-forming composition, and the film-forming composition comprises an azole compound.

3. The release carrier structure according to claim 2, wherein the azole compound comprises an azole compound substituted with an electron-donating group or an azole compound in which an azole ring is fused/condensed with an aromatic ring.

4. The release carrier structure according to claim 3, wherein the azole compound comprises the azole compound substituted with an electron-donating group and the azole compound in which an azole ring is fused/condensed with an aromatic ring.

5. The release carrier structure according to claim 2, wherein the azole compound comprises imidazole, triazole, tetrazole, or a mixture thereof.

6. The release carrier structure according to claim 2, wherein the film-forming composition is alkaline.

7. The release carrier structure according to claim 6, wherein a base equivalent of the film-forming composition is 0.1 wt % to 20 wt % of sodium hydroxide.

8. The release carrier structure according to claim 1, wherein the first release layer and the second release layer are in contact with each other and a contact interface is present therebetween.

9. A copper foil composite structure comprising:
   the release carrier structure according to claim 1; and
   a copper foil located on the second release layer of the release carrier structure.

* * * * *